Figure 7:
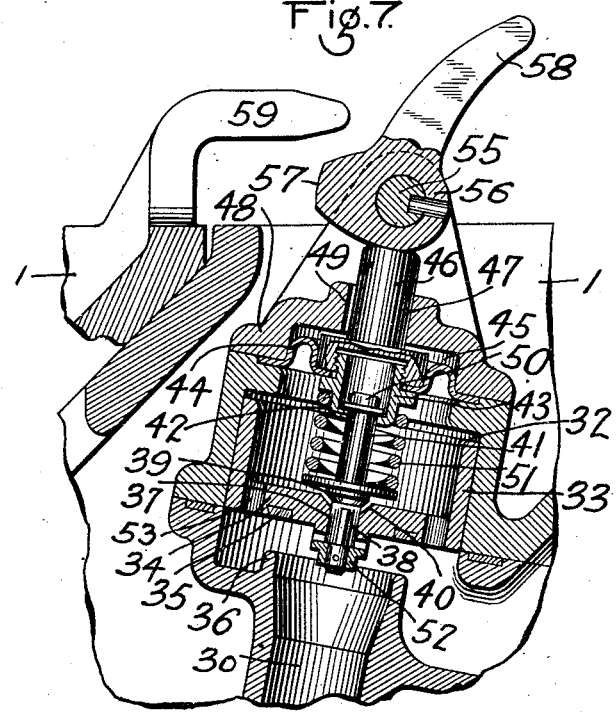

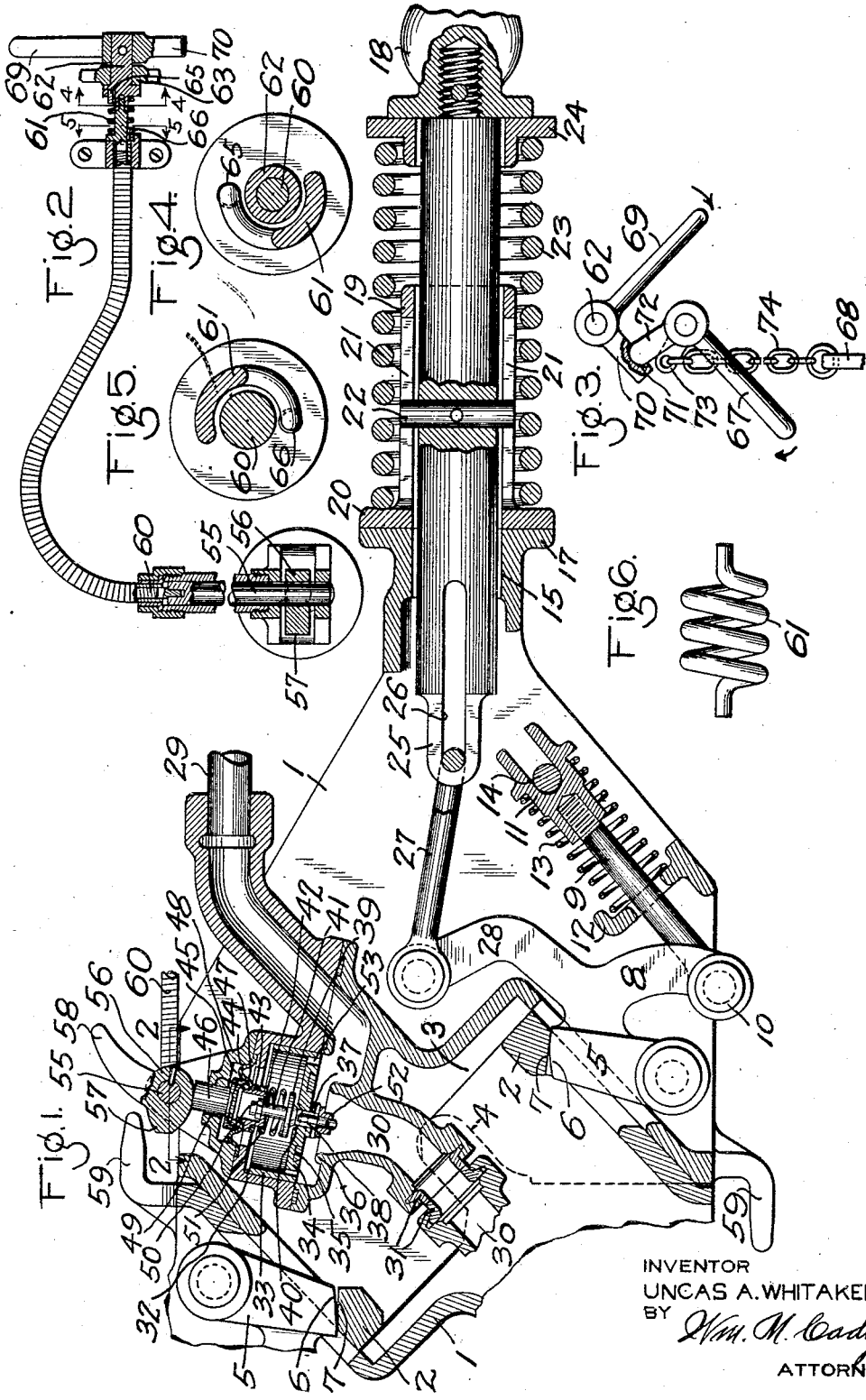

March 22, 1932.  U. A. WHITAKER  1,850,574
TRAIN PIPE COUPLING VALVE DEVICE
Filed Nov. 28, 1928  2 Sheets-Sheet 2

INVENTOR
UNCAS A. WHITAKER
BY *Wm. M. Cady*
ATTORNEY

Patented Mar. 22, 1932

1,850,574

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRAIN PIPE COUPLING VALVE DEVICE

Application filed November 28, 1928. Serial No. 322,317.

This invention relates to automatic train pipe couplings, and more particularly to the type known as the tight or rigid lock coupling.

An object of the invention is to provide a train pipe coupling of the above mentioned type with means for controlling communication through the brake pipe so that when the cars are intentionally separated the brake pipe will be closed, but should the cars be unintentionally separated, the brake pipe will be open to atmosphere to effect an emergency application of the brakes.

Another object of the invention is to provide a train pipe coupling with means for restricting the communication through the brake pipe when an empty section of train is being coupled to a charged train section so as not to produce a too rapid drop in the pressure of the fluid in the brake pipe of the charged section.

Another object of the invention is to provide a train pipe coupling in which the communication through the brake pipe of the coupling is controlled by means of a poppet valve adapted to be manually actuated when the cars are uncoupled and to be automatically actuated when the cars are being coupled.

Another object of the invention is to provide a train pipe coupling having a brake pipe passage controlled by a poppet valve which is so mounted in the coupling that when the coupling is coupled to a counterpart coupling the valve is prevented from closing the brake pipe passage when the brake pipe is charged.

Another object of the invention is to provide an automatic train pipe coupling in which the communication through the brake pipe passage is controlled by means of a semi-automatically actuated valve device.

Another object of the invention is to provide a train pipe coupling in which communication through the brake pipe will be automatically restricted when a charged train section is coupled to an uncharged section, means being included for automatically permitting unrestricted communication through the brake pipe when the pressures of the fluid in the two train sections are so nearly the same amount that an emergency application of the brakes will not result.

Another object of the invention is to provide an automatic train pipe coupling of the character specified, in which communication through the brake pipe is controlled by means of a compound poppet valve.

Another object of the invention is to provide an automatic train pipe coupling wherein communication through the train pipe is regulated by means of a compound valve device which includes a valve piston mounted in a chamber communicating with the train pipe and an auxiliary valve carried by the valve piston and adapted to actuate the same in both directions to either close the brake pipe or open the same.

Another object of the invention is to provide an improved type of train pipe coupling of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

Figure 8:
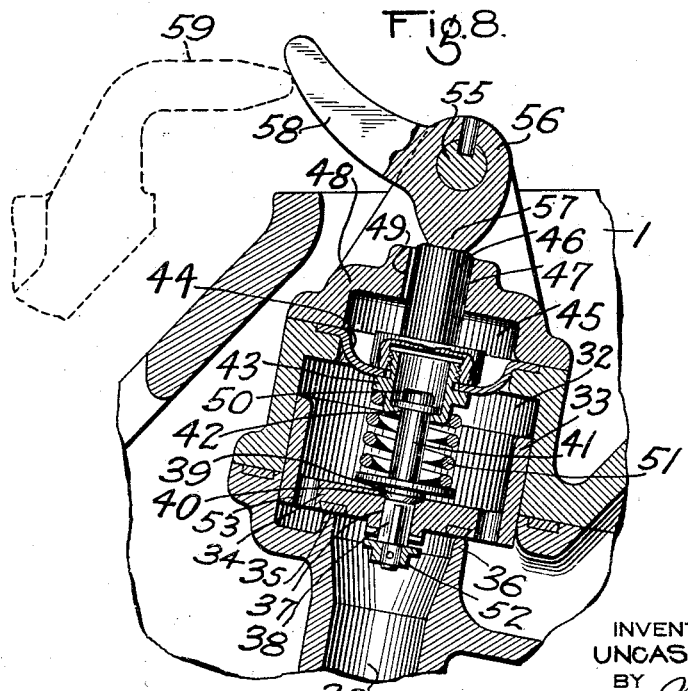

In the accompanying drawings, Figure 1 is a longitudinal section of an automatic train pipe coupling embodying the invention, showing the same in coupled position; Fig. 2 is a section taken on the line 2—2 of Fig. 1, showing the valve actuating mechanism; Fig. 3 is an elevation, partly in section, of the coupling pin unlatching means, showing the same associated with the valve mechanism actuating lever; Fig. 4 is a section taken on the line 4—4 of Fig. 2 showing the manner of anchoring one end of the drive shaft tensioning spring; Fig. 5 is a section taken on the line 5—5 of Fig. 2, showing the manner of anchoring the other end of the drive shaft tensioning spring; Fig. 6 is a detail view of the tensioning spring; Fig. 7 is an enlarged view of a portion of the structure shown in Fig. 1; and Fig. 8 is a view similar to Fig. 7 showing the brake pipe passage closed by the compound valve device.

Train pipe couplings of the type known as the tight or rigid lock coupling, are shown for example, in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge an empty section of train from a charged section.

By the present invention, means are provided by which the brake pipe valve in a coupling is actuated by the car unlatching mechanism to close the brake pipe passage when the car is uncoupled, the valve actuating mechanism being operated automatically to open the valve when the coupling is coupled to a counterpart coupling, and being prevented from operating to close the valve should the cars be unintentionally uncoupled. Means are also provided for automatically restricting the fluid flowing into an uncharged train section from a charged section, when a charged section is coupled to an uncharged section, until the pressures of the fluid in both sections are so nearly the same that an emergency application of the brakes will not result.

Referring to the drawings, the automatic train pipe coupling head 1 comprises a projecting nose 2 adapted to engage in a recess 3 of a counterpart coupling head. The head 1 is also provided with a hooked portion 4 adapted to engage and interlock with a corresponding hook portion of a counterpart coupling head, in the manner fully described in the above mentioned Westinghouse patent.

The coupling head is provided with a pivoted cam or latch lever 5 having a cam surface 6 for engaging a face 7 of a counterpart coupling head.

The lever 5 carries an arm 8 to which a rod 9 is pivotally connected by a pin 10.

Secured to the outer end of the rod 9 is a forked cross head 11, and interposed between said cross head and a fixed abutment 12, is a coil spring 13. A guide pin 14, secured to the coupling head, is adapted to engage in the fork of the cross head 11.

The rear end of the coupling head is formed with an opening 15 which constitutes a guide for the forward end of a stem 16, the end face of the coupling head, around the opening, being extended to provide a flange 17.

The stem 16 has its rear end provided with a ball section 18 adapted to be mounted in a socket (not shown) carried by the car.

Slidably mounted on the stem 16 is a sleeve 19 having one end flanged at 20 for abutting the flange 17. The sleeve 19 is formed with diametrically disposed longitudinal slots 21 into which extend the projecting ends of a pin 22 that is passed transversely through the stem 16.

A coil spring 23 encircles the stem 16 and the sleeve 19, one end of the spring bearing against the flange 20, while the opposite end thereof bears against a collar 24 at the inner end of the stem.

The spring 23 is normally under initial compression, which tends to hold the head 1 extended with respect to the stem 16. However, when the coupling is coupled to a counterpart coupling head, the head 1 will be telescoped on the stem 16, thereby compressing the spring 23 (see Fig. 1).

The front end of the stem 16 is provided with an extended portion 25 having a longitudinal slot 26, and engaging in said slot is a link 27 which is pivotally connected to a lever arm 28 carried by the cam lever 5. As shown in Fig. 1, the slot 26 may extend for a distance into the main body of the stem 16 so as to increase the length of the slot with respect to the length of the portion 25.

The coupling head 1 contains one or more conduits or passages. In the present instance it is shown as having a conduit 30, to the rear end of which is connected the end of a brake pipe 29, while to the forward or nose end of which is mounted a gasket 31 adapted to abut the corresponding gasket on the other coupling, and make a fluid tight joint when the coupling heads are coupled together.

Communicating with the conduit 30, is a chamber 32 containing a poppet valve, which may be in the form of a valve piston 33 having a head 34 provided with a gasket 35 for engaging with a seat rib 36 formed in the conduit 30, when the coupling head is uncoupled, so as to close the open end of the conduit 30 to prevent the escape of fluid therefrom.

Within the gasket 35, the head of the valve piston is pierced to provide an opening 37 for the fluted stem 38 of an auxiliary valve 39, the head of the valve 39 being adapted to engage a seat 40 formed around the opening 37.

The head of the valve 39 is disposed within the valve 33, and projecting from the head of the valve 39 in a direction opposite to the fluted stem 38, is another stem 41 which passes through an opening 42 in the end wall of a cap 43 mounted on one side of a diaphragm 44. The valve piston 33 and the auxiliary valve 39 constitute a compound valve device, the purpose of which will be later explained.

The side of the diaphragm 44 opposite to the side having the cap 43 carries a stem 46 which is slidably mounted in an opening 47 formed in the end wall of the valve casing 48. This side of the diaphragm is spaced from the said end wall of the valve casing to provide a chamber 45.

The extremity of the stem 41 has a head 50 which is adapted to bear against the inner surface of the end wall of the cap 43 and limit the outward movement of the valve 39 with respect to the diaphragm 44 under the force exerted by a spring 51 encircling the stem 41 and bearing against the cap 43 and the valve 39.

On the other hand, movement of the valve 39 relative to the valve piston 33 is limited by a collar 52 mounted on the stem 38. The collar 52 is so constructed as to permit the fluid to flow into the opening 37 when the collar is in engagement with the head 34 of the valve piston 33.

On one side, the diaphragm 44 is subject to the pressure of fluid which is admitted to chamber 32, through a plurality of ports 53 formed in the head of the valve piston 33, while on the other side, the diaphragm is subject to atmospheric pressure admitted to chamber 45 through an opening 49 formed in the end wall of the valve casing 48.

Fixed to a shaft 55 journalled in the coupling head 1, is an actuator 56 for the stem 46. This actuator is provided with a projecting portion constituting a cam 57 which has a flattened nose for engaging the end of the stem 46, in a manner to be described, to detain the stem depressed. The actuator 56 is also provided with an arcuately formed arm 58 which is disposed at an angle to the cam 57.

When the coupling head 1 is coupled to a counterpart coupling, the angular movement of the actuator 56, in a direction that will force the stem 46 inwardly to the end of its traverse, will be prevented by a stop in the form of a nose 59 projecting from the counterpart coupling into the path of the arm 58.

The shaft 55 is operated by a flexible drive shaft 60, one end of which is connected to the end of the shaft 55, while the opposite end thereof is connected through a coil spring 61 to the end of a shaft 62 mounted in a bearing 63 on the end of the car.

One end of the spring 61 is anchored in an opening 65 on the end of shaft 62, while the other end of the spring is anchored in an opening 66 formed on the drive shaft 60, near the end thereof. In this way, when the shaft 62 is rotated, the force will be transmitted through the spring 61 to the flexible shaft 60, and should shaft 60 be prevented from rotating, continued rotation of the shaft 62 will coil the spring tighter, as will be readily understood.

The shaft 62 is preferably disposed at a point contiguous to a lever 67 used for releasing the car coupling locking pin 68, and this shaft is adapted to be manually operated by a lever 69.

The lever 69 has an arm 70 projecting therefrom, and this arm is formed with a recess 71 for receiving the nose end of an arm 72 projecting from the hub of the lever 67 (see Fig. 3), whereby the levers 67 and 69 will be interlocked when the cars are uncoupled.

The lever 67 is also provided with another arm 73 which is connected to the coupling pin 68 by means of a flexible element, such for instance as a chain 74.

In operation, when the cars are intentionally uncoupled, the car couplers are unlocked by manipulating the lever 67 to lift the pin 68, and when the trainman is actuating lever 67 with one hand, the lever 69 is manipulated with the other hand to effect the closing of the brake pipe in a manner to be described, this action placing the nose end of the arm 72 in the recess 71 to interlock the levers together, (see arrows Fig. 3).

After the pin 68 has been lifted and as the cars separate, the train pipe coupling heads 1 will remain coupled and locked together until the cars have moved apart sufficiently to pull the coupling heads 1 outwardly of the stems 16 until further longitudinal movement is prevented by the pins 22 engaging the ends of the slots 21.

This action will also pull the links 27 to the outer ends of the slots 26, whereupon the levers 5 will be swung backwardly out of engagement with the faces 7, thereby permitting the automatic unlocking of the coupling heads. When the coupling heads separate, the springs 23 will maintain the parts in an extended position, ready for coupling up.

When the lever 69 is actuated during the uncoupling operation, the rotation of shaft 62 will be transmitted through spring 61 to the drive shaft 60 and consequently the actuator 56 will be rotated until arm 58 strikes the tip of the nose 59 of the counterpart coupling and further movement of the actuator prevented.

However, as the angle of rotation of the shaft 62 in positioning the recess 71 on the arm 70 so that it will receive the nose of the arm 72 when the levers 67 and 69 are actuated to uncouple the cars, is greater than the angle of rotation of the actuator 56, this excess of rotation of the shaft 62 will be absorbed by the spring 61 which will be coiled tighter.

Therefore, when the coupling heads 1 separate and the nose 51 is thus moved away from the path of the arm 58, the force of the stored up pressure of spring 61 will be released, and the flexible shaft 60 will be rotated. This action will rotate the cam 57 until its flattened extremity engages the end of the stem 46. In this way the stem 46 is depressed and this action will move the diaphragm 44 downwardly.

When the diaphragm 44 is initially moved downwardly, its movement will be transmitted through spring 51 to the auxiliary valve 39, and the latter will be forced toward its seat 40 in the head of the valve piston 33. Continued rotation of the cam 57 will therefore gradually depress the stem 46, which in turn forces the diaphragm and the valve piston downwardly until the valve piston engages the seat rib 36.

When the flattened extremity of the cam 57 engages the end of the stem 46, the parts of the valve device will be positioned as shown in Fig. 8. Auxiliary valve 39 will be pressed to its seat 40 by the force exerted by spring 51, and consequently the valve piston 33 will be held tightly against its seat.

As the shaft 55 is disposed in the same plane as the stem 46, when the flattened extremity of the cam 57 is in engagement with the end of the stem, relative movement of the actuator 56 with respect to the valve will be prevented, and the parts will remain in locked position until the actuator is again rotated.

When the cars are brought together for coupling up, the projecting nose 2 of one train pipe coupling enters the recess 3 of the counterpart coupling and in this movement, the cam lever 5 is forced rearwardly by the nose 2. The hooked portions 4 of the two couplings become interlocked through the relative and lateral longitudinal movement and the gaskets 31 meet, so that the train pipe openings are connected together.

When the train pipe coupling head on each car moves rearwardly on the stem 16, the sleeve 19 will be carried with it, thereby compressing the spring 23 between the flange 20 and the collar 24 which are brought closer together.

When the coupling head 1 and the stem 16 are thus telescoped together, link 27 will be carried rearwardly of the slot 26, and the pressure of spring 13 will force the lever 5 outwardly toward the nose 2, so that the cam face 6 engages the face 7 of the counterpart coupling head and locks the two coupling heads tightly together.

Inasmuch as the coupling heads will be held telescoped on the stems 16 during the time the car couplers are locked together, the loop end of the link 27 will not engage the outer end of the slots 26. Therefore, the levers 5 will be retained in locked position by the pressure exerted by the spring 17, and these latches will remain in such position as long as the cars remain coupled together by virtue of the lost motion provided by the slotted connections between the several parts.

When the coupling heads 1 are brought together for coupling up, the end of the nose 59 engages the arm 58 of the actuator on the counterpart coupling and the arm is swung upwardly, thereby unseating the flattened end of the cam 57 from the stem 46. When the interlocked parts of the valve actuating mechanism are thus unlocked, and as the cam 57 turns to the position shown in Fig. 7, the pressure of the fluid in the charged section of train acts on the diaphragm 44 to force the same upwardly.

During this upward movement of the diaphragm, the cap 43 will engage the head 50 of the stem 41, and in this way the auxiliary valve 39 will be unseated to permit flow of the fluid in the charged section to the uncharged section at a restricted rate.

As the effective area of the diaphragm 44 is less than the area inside seat rib 36 on the lower face of the valve piston 33, when the latter is seated against the seat rib while the coupling head 1 is uncoupled, when the cars are coupled together and the arm 58 of the actuator 56 is engaged by the nose 59 of the counterpart coupling and rotated, the pressure of the fluid in chamber 32 maintains the valve piston 33 seated against the upwardly acting force on the diaphragm 44.

When the pressure builds up in the uncharged section to a degree sufficient to reduce the differential over the valve piston 33 inside the seat rib 36 to a predetermined degree, the pressure in chamber 32 on diaphragm 44 is sufficient to pull the valve piston to its upper position, thereby opening unrestricted communication through the conduit 30.

If the cars unintentionally separate, the actuator 56 will not be manually operated to depress the diaphragm 44, and consequently the valve piston 33 will remain unseated, thereby permitting an unrestricted flow of fluid through the open end of the conduit to effect a quick reduction in brake pipe pressure. In this way the pressure over the entire lower face of the valve piston 33 will reduce at the same time. Ports 53 are of such flow area as to permit pressure from chamber 32 to reduce with the pressure on the lower face of the valve piston 33. The pressure on the valve piston thus remains equal and the pressure on the diaphragm 44 is therefore permitted to hold said valve piston in the fully opened position, thereby producing an emergency application of the brakes.

While one illustrative embodiment of the invention has been described in detail, it is not my intention to limit its scope to that embodiment or otherwise than by the terms of the appended claims.

Having now described my invention, what

I claim as new and desire to secure by Letters Patent, is:—

1. An automatic coupling having a conduit, a chamber communicating with the conduit, a compound valve mounted in the chamber, said valve including a valve piston adapted to close the conduit and auxiliary valve mounted in the head of the valve piston, and means for actuating the compound valve including a diaphragm flexibly connected to said auxiliary valve.

2. A coupling having a conduit, a chamber communicating with the conduit, a valve piston mounted in the chamber and having a seat for closing the conduit, an auxiliary valve mounted for limited movement relative to the valve piston to permit a restricted amount of fluid to flow through the conduit when the valve piston is seated, a diaphragm connected to the auxiliary valve, said diaphragm being subject on one side to the pressure of the fluid in the chamber, and means for actuating the diaphragm from the opposite side for seating the compound valve to close the conduit when the coupling is uncoupled.

3. An automatic coupling having a conduit provided with a valve chamber, a main valve slidably mounted in the chamber and adapted to regulate the amount of fluid passing through the conduit, an auxiliary valve mounted for movement relative to the main valve, a diaphragm mounted in the chamber and subject to the pressure of the fluid therein, means for flexibly connecting the diaphragm to the auxiliary valve, and means for actuating the diaphragm when the coupling is being uncoupled to move the same in a direction against the pressure of the fluid in the chamber to effect the closing of the valves.

4. An automatic train pipe coupling having a compound valve for controlling the amount of fluid passing therethrough, said compound valve comprising a main valve and an auxiliary valve mounted in the main valve and controlling a restricted communication therethrough, and means for actuating the compound valve including a diaphragm flexibly connected to said auxiliary valve.

5. A train pipe coupling having a chamber, a valve mounted in the chamber, an auxiliary valve mounted in said first named valve, and means for actuating the auxiliary valve to cause a retarded operation of the first named valve including a diaphragm flexibly connected to said auxiliary valve.

6. An automatic coupling having a conduit, a chamber communicating with the conduit, a compound valve mounted in the chamber, said valve including a valve piston having an independently movable auxiliary valve, and means including a diaphragm connected to said auxiliary valve for actuating the auxiliary valve to cause a retarded movement of the valve piston.

7. An automatic train pipe coupling having means for regulating the amount of fluid flowing through a passage therein which includes a compound valve device comprising a valve piston, an auxiliary valve carried by the valve piston and adapted to actuate the same in both directions to either close the passage or to open the same, and a diaphragm flexibly connected to said auxiliary valve.

8. An automatic train pipe coupling having means for regulating the amount of fluid flowing through a passage therein which includes a valve piston, an auxiliary valve carried by the valve piston and adapted to be initially operated to move the valve piston for either closing the passage or for opening the same when the coupling is being uncoupled from or coupled to another coupling, and a diaphragm flexibly connected to said auxiliary valve for operating the same.

9. An automatic train pipe coupling having a valve device for controlling the amount of fluid flowing through a passage therein, comprising a poppet valve, an auxiliary valve carried by the poppet valve and movable independently thereof, and a diaphragm flexibly connected to said auxiliary valve for actuating the same and thereby effect the operation of said poppet valve.

In testimony whereof I have hereunto set my hand, this 26th day of November, 1928.

UNCAS A. WHITAKER.